March 21, 1939.  R. L. GILLSON  2,151,198
HYDRAULIC BRAKE
Filed Jan. 13, 1936
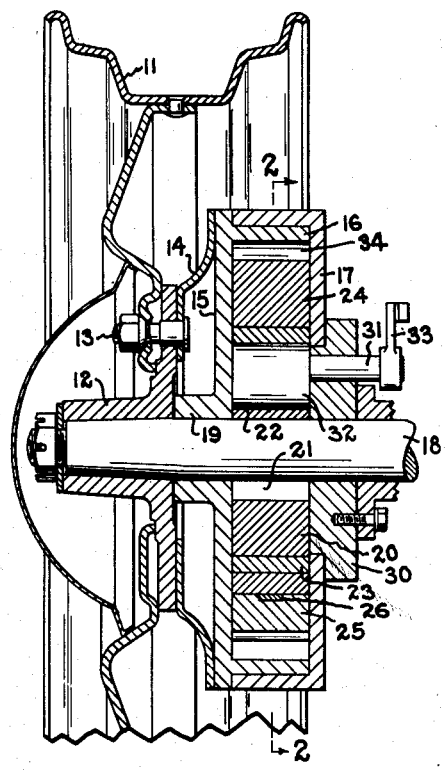
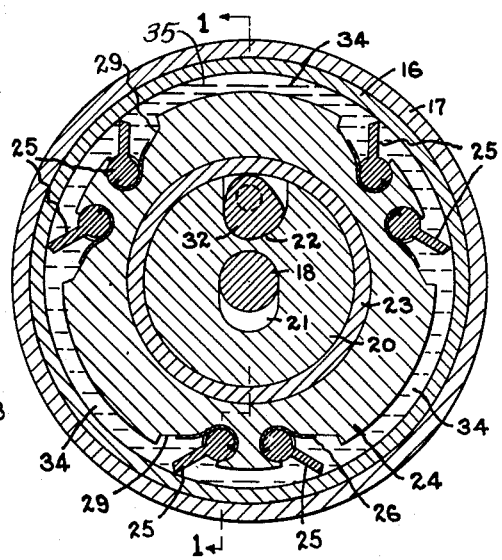
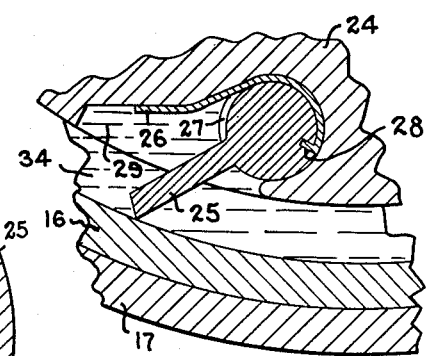
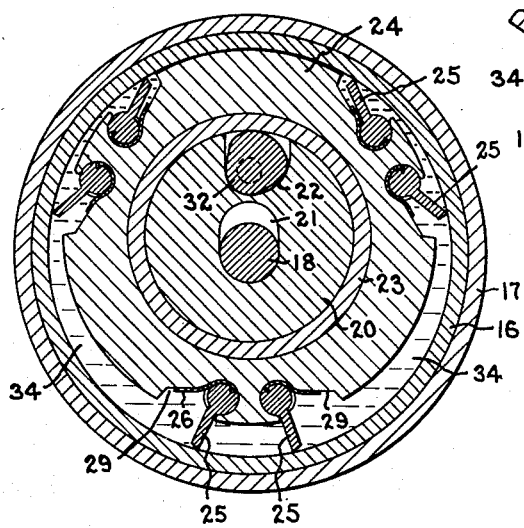
INVENTOR
RAYMOND L. GILLSON.
BY *H. C. Karel.*
ATTORNEY Patented Mar. 21, 1939

2,151,198

UNITED STATES PATENT OFFICE 2,151,198

HYDRAULIC BRAKE

Raymond L. Gillson, Cincinnati, Ohio

Application January 13, 1936, Serial No. 58,851

19 Claims. (Cl. 188—90)

My invention relates to a hydraulic brake with its principal use being in connection with motor vehicles.

The object of my invention is to provide a brake of simple, efficient and economical construction wherein the fluid used to provide the braking action is contained within the brake housing.

A further object is to provide a brake housing having a concentric inner periphery and a concentric inner member of smaller diameter rotating with and at substantially the same speed as said housing and normally rotating about the fixed center of said housing but being rotated about its own true center, which center may be moved away from the center of the housing to create a compressible action on the fluid confined between said member and the housing whereby a braking action will ensue when the pressure within the housing overcomes the external pressure.

A further object is to provide the compression collar with wall-like fingers, to create a plurality of compression chambers and so arranged to permit equalization of the fluid in the chambers.

My invention will be further readily understood from the following description and claims, and from the drawing, in which latter:

Fig. 1 is a vertical cross-section of my improved brake, shown in connection with a vehicle wheel which is partly broken away, and taken in the plane of the irregular line 1—1 of Fig. 2.

Fig. 2 is a sectional view of the brake, taken on the line 2—2 of Fig. 1.

Fig. 3 is a sectional view similar to Fig. 2, with the inner members moved to an eccentric position, and Fig. 4 is an enlarged view of one of the fingers and its spring.

I have shown my improved brake in connection with a vehicle wheel 11, removably attached to a hub 12 as by bolts 13. A portion of the brake housing is attached to the hub in any suitable manner, indicated in the drawing as by flanges 14.

My brake comprises a housing 15 having a concentric flange 16 over which a cover 17 is suitably secured and sealed. The housing 15 is supported on the axle 18 of the vehicle by a flange 19. A disc member 20 within the housing has an elongated aperture 21 through which the axle extends and is also provided with a cam guide 22. This member 20 is shown anchored between the cam and shaft 18, but any other suitable anchoring means may be used to prevent the member 20 from rotating. Surrounding the disc is a bearing 23 shown as a slip-ring 23 having a running fit with the disc and a concentric compression collar 24. This slip-ring may be in the form of any well known roller or ball bearing. Pivoted to the collar 24 are a plurality of wall-like fingers 25 arranged to have their outer edges contact the inner face of the housing. These fingers are maintained in contact with the inner face of the housing by means of springs 26, received in grooves 27 in the fingers and hooked thereto as at 28, with the other end of the spring resting on the cut-away portion 29 of the collar. The tendency of the spring is to straighten out thus keeping the fingers in contact with the inner face of the housing. A supporting collar 30 has a running fit with the cover 17 and the axle 18 and is secured to the axle housing on the rear wheels or to the steering knuckle on the front wheels. A cam operating shaft 31 is received through the supporting collar and operates the cam 32, which is contained within the housing and rides in the cam guide 22 between the member 20 and the slip-ring. Suitable means are provided for operating the cam shaft, which may consist of a lever 33 secured to the shaft and operated by the foot brake pedal or other means.

The cam is so arranged that in normal non-braking position it will hold the disc and its component parts in a true center with the housing, to maintain the entire device in balance.

The spaces 34 between the fingers, collar 24 and the housing are substantially filled with a suitable fluid, such as lubricating oil, the level of which is indicated as at 35.

It will be noted that the fingers 25 are set in an angular relation to the housing, with each pair having their ends inclined toward each other forming a compression chamber therebetween and forming end walls for each chamber. Thus any fluid leaking past a finger will readily enter the next chamber due to the next finger being inclined in the opposite direction and the spring being only of sufficient strength to hold the finger outwardly. As a compression force is exerted within a chamber, such force will be applied to the fingers, thus causing the fingers to firmly seal the chamber. It will therefore be apparent that the fingers not only form an efficient seal but permit automatic adjustment or equalization of the fluid around the collar 24. With the collar 24 moved to a compressible position, the chamber moving out of the compression position will continually increase in size until it reaches a position opposite the cam. During this cycle of operation a suction will be created in the chamber causing the chamber to draw fluid from the chamber in advance thereof until all chambers have an equal amount of fluid therein.

In the operation of my improved brake, the pressure collar 24 under normal conditions floats in the position shown in Fig. 2, and will rotate with the housing. Upon applying pressure to the brake pedal or other means, the cam through connections to the cam shaft will be moved to move the disc, slip-ring and collar away from the true center of the housing, but the collar 24 will continue to rotate with the housing until the force exerted by the fluid between the collar and the housing becomes greater than the external force at which time both the collar and the housing will cease to rotate. Inasmuch as the fluid is non-compressible it will resist the compression action between the fingers, collar and housing thus retarding the rotative movement of the wheels.

While in Fig. 3, I have shown the extreme throw of the cam, under operating conditions this position will not be assumed, as a slight throw of the cam is sufficient when the casing is filled with fluid to cause the braking action. I have provided this additional throw of the cam to compensate for any loss of fluid or wear of the parts.

To more clearly explain the action that takes place when the collar 24 is moved away from the center of the housing, the fluid which is non-compressible acts as a flexible wedge between the collar and the housing and as the collar cannot rotate around its own true center without decreasing the space between it and the housing a braking action will take place causing the housing to stop rotating.

It will be apparent from the foregoing, that I have constructed a novel, efficient brake which will lend itself for adoption with any construction requiring a brake to be applied to a rotating object. While I have shown it in connection with a vehicle wheel, it is apparent that my improved brake can be used on airplanes and other mechanisms.

Having thus fully described my invention, what I claim as new and desire to secure by Letters Patent, is:

1. A hydraulic brake consisting of a plurality of chambers having walls moving in unison, movable end walls for said chambers, means for converging said chambers, and fluid in said chambers exerting a pressure on said walls when said chambers are converged and causing said converged chambers to be non-communicating.

2. A hydraulic brake consisting of a plurality of arcuate chambers having walls moving in unison, movable end walls for each chamber, means for converging the peripheral walls of the chambers, and fluid in said chambers exerting a pressure on said walls when said chambers are converged and causing said converged chambers to be non-communicating.

3. A hydraulic brake comprising a housing, a member rotatable within and with said housing, fluid in said housing about said member, means for dividing the space between said housing and member into a plurality of chambers, and means for shifting the axis of said member to a position for causing a compressible action on said fluid between said member and housing and causing said chambers under compression to be non-communicating.

4. A hydraulic brake comprising a housing, a member rotatable within and with said housing, said member provided with a plurality of fingers contacting said housing, fluid in said housing about said member, and means for shifting the axis of said member to a position for causing a compressible action on said fluid between said member, fingers and housing.

5. A hydraulic brake comprising a housing, a non-rotating member within said housing, a second member rotatable on said non-rotating member and provided with a plurality of fingers contacting said housing, fluid in said housing about said rotatable member, and means for shifting said rotatable member to an eccentric position causing a braking action through said fluid on said housing.

6. A hydraulic brake comprising a housing, a non-rotatable member within said housing, a second member rotatable on said non-rotating member and provided with a plurality of fingers, means for maintaining said fingers in contact with said housing, fluid in said housing about said rotatable member, and means for shifting said rotatable member to an eccentric position for causing a braking action through said fluid on said housing.

7. A hydraulic brake comprising a rotating housing, a non-rotating member within said housing, a bearing about said member, a second member rotatable on said bearing, a plurality of fingers extending from said second member, means for maintaining said fingers in contact with said housing, fluid in said housing about said rotatable member, means for shifting said rotatable member to an eccentric position for causing a braking action through said fluid on said housing.

8. A hydraulic brake comprising a rotating concentric housing, a non-rotating member within said housing normally concentric with said housing, a second member within said housing movable about said non-rotating member, means for moving said members to an eccentric position relative to said housing, fluid in said housing about said second member, means for dividing the space between said housing and member into a plurality of chambers, and said fluid causing a compression between said member and said housing and causing said chambers under compression to be non-communicating.

9. A hydraulic brake comprising a rotating concentric housing, fluid in said housing, a non-rotating member within said housing, a second member rotatable about said member, a plurality of pairs of fingers extending from said second named member, springs for urging said fingers outwardly, a cam for moving said rotating member to an eccentric position relative to said housing causing a compressible action on said fluid.

10. A hydraulic brake comprising a rotating concentric housing, fluid in said housing, a non-rotating member within said housing, a bearing about said member, a second member rotatable on said bearing, a plurality of pivoted pairs of fingers extending outwardly from said second named member, springs for urging said fingers outwardly, and a cam for moving said rotating member to an eccentric position relative to said housing causing a compressible action on said fluid.

11. In a hydraulic brake comprising a concentric housing, a member rotatable within and with said housing, means for dividing the space between said housing and said member into a plurality of non-communicating chambers, a cam coacting with said member for moving said member to an eccentric position, whereby certain of said chambers will be non-communicating, and a non-rotating member within said rotating member having contact with said cam for returning said members to a concentric position.

12. In a hydraulic brake comprising a concentric housing, a rotatable member within said housing, fingers pivoted to said member, a cam coacting with said member for moving said member to an eccentric position, and a non-rotating member within said rotating member having contact with said cam for returning said members to a concentric position.

13. In a hydraulic brake comprising a housing, a member in said housing, fluid in said housing about said member, pairs of fingers pivoted to said member with their ends inclined toward each other and contacting said housing, said pairs of fingers forming chambers about said member, and said fingers automatically permitting an equalization of the fluid in said chambers.

14. A hydraulic brake comprising a housing, a member in said housing, fluid in said housing about said member, a non-rotating member withing said first named member, means for moving said members to an eccentric position, pairs of fingers pivoted to said first named member with their ends inclined toward each other and contacting said housing, said pairs of fingers forming chambers about said first named member, and said fingers automatically permitting an equalization of the fluid in said chambers.

15. A hydraulic brake comprising a housing, a member in said housing, fluid in said housing, a non-rotatable member within said member, a bearing ring between said members, means for moving said members to an eccentric position, pairs of fingers pivoted to said first named member with their ends inclined toward each other and contacting said housing, said pairs of fingers forming chambers about said first named member, and said fingers automatically permitting an equalization of the fluid in said chambers.

16. A hydraulic brake comprising a pair of co-rotating members normally concentric, non-communicating chambers between said members, one of said members movable to cause said chambers to converge during one-half of a revolution and to expand during the other half of a revolution.

17. A hydraulic brake comprising a pair of co-rotating members normally concentric, non-communicating chambers between said members, fluid in said chambers, one of said members movable to cause a compression and a vacuum cycle in each complete revolution of said members for applying pressure between said members during said compression cycle.

18. A hydraulic brake comprising a pair of co-rotating members, one of said members rotating about a fixed axis, the other member having a non-rotating bearing movable in a fixed plane, fluid confined in chambers between said members whereby movement of said second member will cause a pressure to be exerted through said fluid on said members for creating a braking action through said members and causing said chambers under pressure to be non-communicating.

19. In a device for applying pressure between a pair of co-rotating members rotatable on separate axes and having the space between said members divided into chambers containing fluid, whereby movement of one of said members radially will cause a pressure to be exerted on said fluid between said members in some of said chambers and causing said chambers to be non-communicating for causing cessation of rotation of said members.

RAYMOND L. GILLSON.